(No Model.) 2 Sheets—Sheet 1.

J. M. WILKINSON.
ANIMAL TRAP.

No. 574,294. Patented Dec. 29, 1896.

Witnesses
Geo. E. Frech
J. A. Wilson

Inventor
John M. Wilkinson
By H. B. Willson,
Attorney (No Model.) 2 Sheets—Sheet 2.

J. M. WILKINSON.
ANIMAL TRAP.

No. 574,294. Patented Dec. 29, 1896.

Witnesses
Geo. E. French
J. A. Nillson

Inventor
John M. Wilkinson.
By H. B. Willson,
Attorney

UNITED STATES PATENT OFFICE.

JOHN MARION WILKINSON, OF BATESVILLE, ARKANSAS.

ANIMAL-TRAP.

SPECIFICATION forming part of Letters Patent No. 574,294, dated December 29, 1896.

Application filed July 29, 1896. Serial No. 600,908. (No model.)

*To all whom it may concern:*

Be it known that I, JOHN MARION WILKINSON, a citizen of the United States, residing at Batesville, in the county of Independence and State of Arkansas, have invented certain new and useful Improvements in Animal-Traps; and I do declare the following to be a full, clear, and exact description of the invention, such as will enable others skilled in the art to which it appertains to make and use the same.

My invention has relation to improvements in animal-traps, and more particularly to that class of traps having an open bait-chamber and a closed chamber so arranged that after the animal is caught in the bait-chamber in passing into the closed chamber he automatically resets the bait-chamber.

The object is to provide a simple and convenient device of this kind, whereby a number of animals may be successively caught; and to this end the novelty consists in the construction, combination, and arrangement of the same, as will be hereinafter more fully described, and particularly pointed out in the claims.

In the accompanying drawings the same figures of reference indicate the same parts of the invention.

Figure 1:
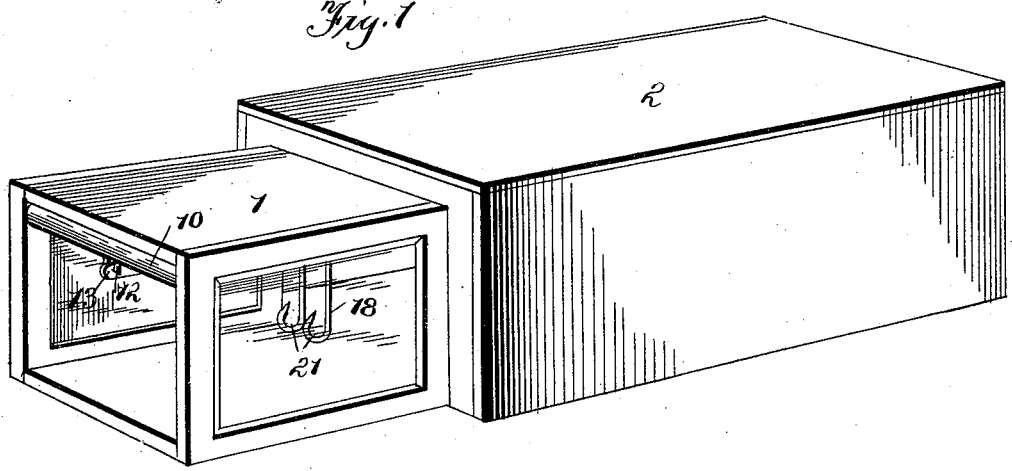
Figure 2:
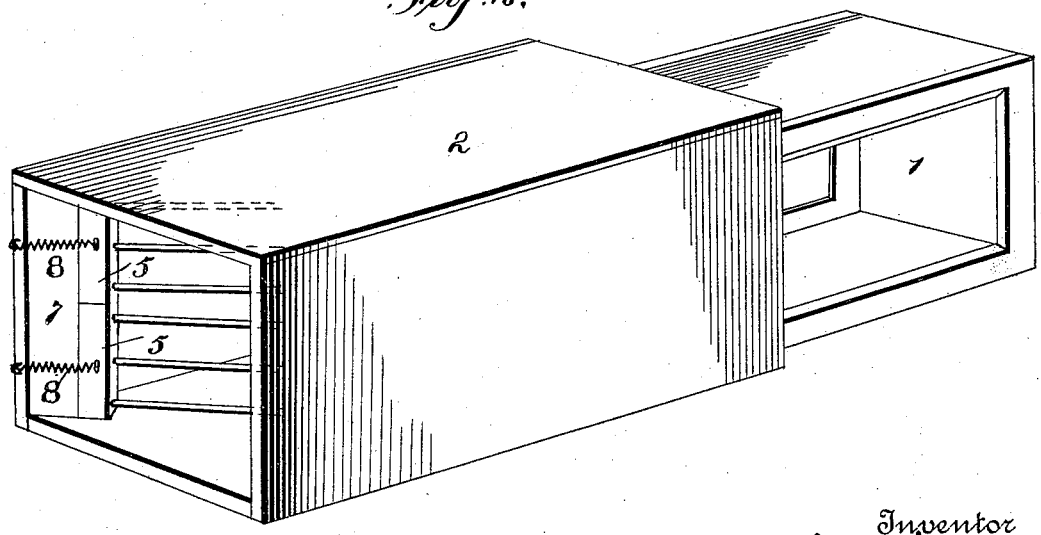
Figure 3:
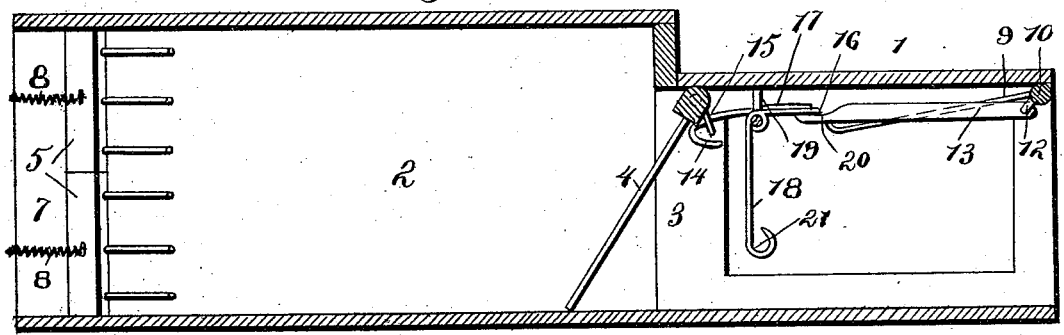
Figure 4:
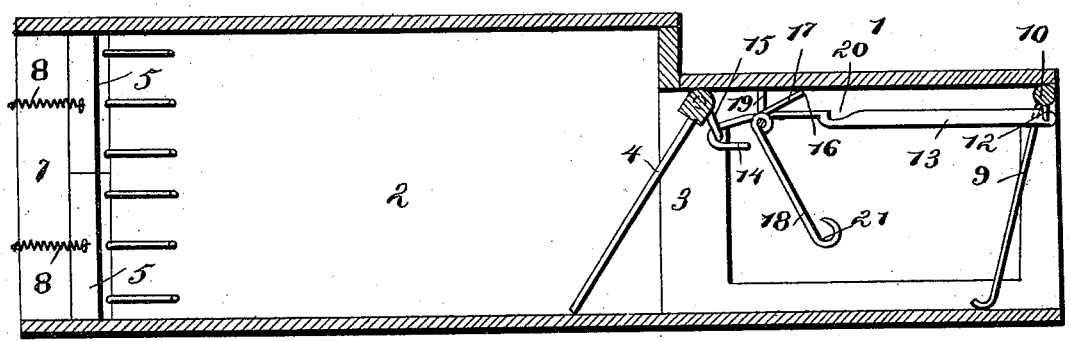
Figure 5:
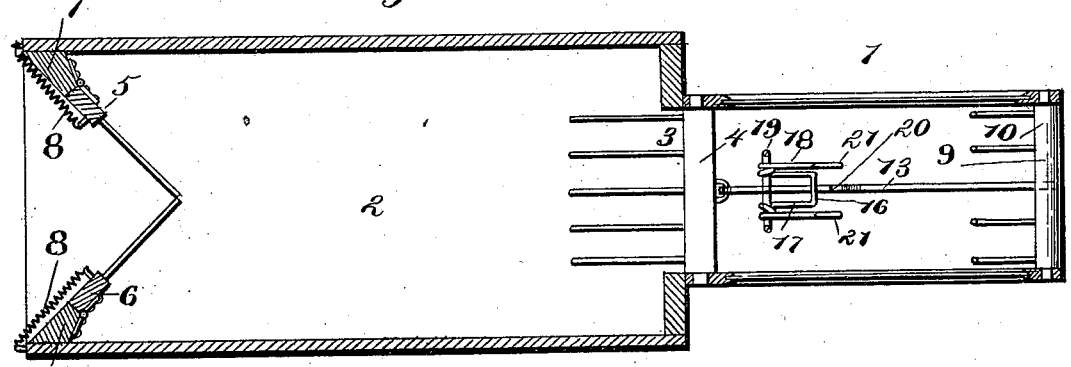

Figure 1 is a perspective view of my improved animal-trap, taken from the front or bait-chamber end. Fig. 2 is a similar view taken from the rear or closed-chamber end. Fig. 3 is a longitudinal section of the trap as it appears when set. Fig. 4 is a similar view of the trap when sprung, and Fig. 5 is a horizontal section of the same.

1 is the bait-chamber, and 2 the closed chamber, the opening or passage 3 between the two being provided with a grated door 4, which opens freely in the path of an animal passing from the bait-chamber into the closed chamber, but is closed by gravity against its return or any attempt to pass from the closed chamber back again into the bait-chamber.

The rear rend of the closed chamber 2 is provided with two pairs of inwardly-opening vertically-hinged grating doors 5 5 and 6 6, each pair being hinged to the uprights 7 7, located on each side of the end of the chamber. These gratings or doors are each provided with a spiral spring 8, connected to the face of the uprights 7, so as to allow the doors to open inwardly to admit the passage of an animal, and when the springs close the door they hold the free ends of the grating at an acute angle, as shown in Fig. 5, and thereby prevent the exit of an animal in the chamber 2.

The entrance to the bait-chamber 1 is provided with a transversely-mounted grated trap-door 9, hinged to the top of the bait-chamber and adapted to close by gravity, the hinged bar 10 of said door being provided with a staple 12, to which is pivoted one end of a horizontal trip-rod 13, the opposite end of which is formed with a link 14, engaging a staple 15 on the swinging grated door 4, the connection being such that if the trap-door 9 be raised the link 14 will slide forward in the staple 15 without operating the grated door 4, but if the trap-door 9 be closed and the grated door 4 be raised the staple 15 on said door 4 draws the trip-rod 13 backward, raising the trap-door 9 to a horizontal position. At the same time the end 16 of horizontal arm 17 of the bait-trigger 18, fulcrumed in the bracket 19, falls by gravity into the detent 20 in the trip-rod 13 and holds the trap-door 9 suspended after the grated door 4 has fallen by gravity to its normally-closed position.

The depending arm 21 of the bait-trigger is formed with suitable hooks, as shown, to which the bait is secured.

The trap being first set, as shown in Fig. 3, an animal entering the bait-chamber 1, passing under the trap-door 9, attacks the bait on the hooked end of the trip 18. This raises the end 16 of the horizontal arm 17, releasing it from the detent 20, allowing the trap-door 9 to fall by gravity behind the animal and inclose it in the bait-chamber. The animal then passes under the grated door 4, raising it in doing so, and as it raises its staple 15 in the link 14 draws the trip-rod 13 backward, raising the trap-door 9, as above described. At the same time the end 16 of the horizontal arm 17 of the bait-trigger falls by gravity into the detent 20 in said trip-rod, thereby holding the trap-door 9 in a suspended position, thus setting the bait-chamber ready for the next visitor.

By submerging the trap in a waterway the bait-chamber forms a reliable trap for animals like the muskrat, mink, otter, and similar fur-bearing animals, and the grating doors 5 5 and 6 6 will readily permit the entrance of fish into the chamber, and the peculiar arrangement of the doors prevents their exit.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. A trap comprising the bait-chamber 1, the closed chamber 2 provided with the inwardly-opening vertically-hinged doors 5 5 and 6 6 having springs 8, in combination with the grating door 4 in the passage 3, the trap-door 9 having staple 12 to which is pivoted the trip-rod 13 formed with a detent 20, and the bait-trigger 18 fulcrumed in the bracket 19, and provided with the horizontal arm 17 and the depending arm 21 to which the bait is attached, substantially as and for the purpose set forth.

2. A trap comprising the closed chamber 2 provided with the inwardly-opening double doors 5 5 and 6 6, each of which is provided with a spring 8, and the bait-chamber 1 connected to the chamber 2 by a passage 3, a grated door 4, having a staple 15, a trip-rod 13, having a detent 20, and having one end formed with a link 14 connected to the staple 15, and its opposite end pivoted to the staple 12 of the trap-door 9, in combination with the bait-trigger 18, having the horizontal arm 17, the end 16 of which is located in the path of the detent 20, and having depending arms 21, to which the bait is attached, substantially as and for the purpose set forth.

In testimony whereof I hereunto affix my signature in presence of two witnesses.

JOHN MARION WILKINSON.

Witnesses:
JAS. W. HOLMES,
J. B. PRITCHETT.